United States Patent
Vadivelu

(10) Patent No.: US 10,484,254 B2
(45) Date of Patent: Nov. 19, 2019

(54) SYSTEM AND METHOD FOR END-TO-END BEACONING

(71) Applicant: AVAGO TECHNOLOGIES INTERNATIONAL SALES PTE. LIMITED, Singapore (SG)

(72) Inventor: Ramkumar Vadivelu, San Jose, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 0 days.

(21) Appl. No.: 15/071,907

(22) Filed: Mar. 16, 2016

(65) Prior Publication Data

US 2016/0197807 A1    Jul. 7, 2016

Related U.S. Application Data

(62) Division of application No. 12/258,643, filed on Oct. 27, 2008, now Pat. No. 9,319,462.

(51) Int. Cl.
| | |
|---|---|
| H04L 12/26 | (2006.01) |
| H04L 29/08 | (2006.01) |
| H04L 29/14 | (2006.01) |
| G08B 5/36 | (2006.01) |
| H05B 33/08 | (2006.01) |
| H05B 37/02 | (2006.01) |

(52) U.S. Cl.
CPC ............ *H04L 43/0811* (2013.01); *G08B 5/36* (2013.01); *H04L 67/1097* (2013.01); *H04L 69/40* (2013.01); *H05B 33/0854* (2013.01); *H05B 37/0227* (2013.01)

(58) Field of Classification Search
CPC ............. H04L 43/0811; H05B 37/0227; G06F 3/0605; G06F 3/0632; H04B 10/00; G11B 33/126
See application file for complete search history.

(56) References Cited

U.S. PATENT DOCUMENTS

| | | | |
|---|---|---|---|
| 6,650,368 B1 | 11/2003 | Doron | |
| 7,010,607 B1* | 3/2006 | Bunton | ...................... H04L 1/18 709/228 |
| 7,046,928 B1* | 5/2006 | Bradford | ................ H04B 10/00 398/16 |
| 7,216,192 B2* | 5/2007 | Boulay | .................. G06F 3/0605 710/104 |
| 7,788,369 B2 | 8/2010 | McAllen | |
| 2003/0018756 A1* | 1/2003 | Nguyen | .............. G06F 11/2005 709/220 |
| 2005/0135056 A1* | 6/2005 | Suzuki | .................. G06F 3/0614 361/679.33 |

(Continued)

*Primary Examiner* — Mirza F Alam
(74) *Attorney, Agent, or Firm* — Xsensus, LLP

(57) ABSTRACT

An embodiment of a method includes generating a command configured to cause activation of local beaconing at a selected device, and transmitting the command to the selected device. An embodiment of a system includes a processor, a memory including instructions executable by the processor, wherein the instructions cause the processor to generate a command configured to cause a selected device to activate local beaconing, a port connected to the selected device, and a transmitter operable to transmit the command to the selected device via the port.

17 Claims, 7 Drawing Sheets

(56) References Cited

U.S. PATENT DOCUMENTS

| | | | | |
|---|---|---|---|---|
| 2005/0138428 A1* | 6/2005 | McAllen | ............... | H04L 29/06 |
| | | | | 726/4 |
| 2005/0246479 A1* | 11/2005 | Boulay | ............... | G06F 3/0605 |
| | | | | 711/100 |
| 2009/0091468 A1* | 4/2009 | O'Bra | ............... | A45C 13/18 |
| | | | | 340/815.69 |

* cited by examiner

SYSTEM AND METHOD FOR END-TO-END BEACONING

RELATED APPLICATIONS

This application is a divisional of U.S. application Ser. No. 12/258,643, entitled "System and Method for End-to-End Beaconing," filed Oct. 27, 2008, which is incorporated by reference.

This application is related to U.S. application Ser. No. 15/071,877, entitled "System and Method for End-to-End Beaconing," filed concurrently herewith, which is also a divisional of U.S. application Ser. No. 12/258,643 and which is hereby incorporated by reference.

BACKGROUND

A storage area network (SAN) may be implemented as a high-speed, special purpose network that interconnects different kinds of data storage devices with associated data servers on behalf of a large network of users. Typically, a storage area network includes high performance switches as part of the overall network of computing resources for an enterprise. The storage area network may be clustered in close geographical proximity to other computing resources, such as mainframe computers, but may also extend to remote locations, such as other enterprise sites, for backup and archival storage using wide area network carrier technologies.

The various components of the SAN are interconnected by cables. A typical data-center contains many racks of interconnected equipment, such as switches. SAN administrators often wish to determine the cable connectivity between host devices, switches and target devices. For example, an administrator may wish to learn whether two devices are connected and if so, at which ports. Such a determination can be difficult for a large number of interconnected devices, and depending on the location of the devices relative to each other. For example, often cables are routed through false ceilings or floors to link devices in different parts of a building. In addition, cables are often bunched, for example in groups of 10 or 20 cables. Of course, the administrator generally cannot disconnect cables to determine connectivity without disrupting communication. Given these typical situations, it can be very difficult, if not impossible, to determine cable connectivity by manual inspection among the various devices of a SAN.

SUMMARY

Embodiments of the described technology relate to systems and methods for indicating end-to-end connectivity between devices. In some embodiments, connectivity is indicated using beaconing between devices. Beaconing may involve causing two devices on opposite ends of a link to activate an indicator (e.g., blinking light-emitting diode (LED) or lamp) at respective ports to which the link connects. A first device can generate a beacon command to a second device. The second device receives the beacon command and begins beaconing in response thereto. The second device can generate an acceptance reply to the first device, indicating acceptance of the beacon command. The first device may begin beaconing before or after receiving the acceptance reply.

An embodiment of a method for determining connectivity between a first Fibre Channel (FC) device and a second FC device includes issuing a beacon command from an issuance port of the first FC device to the second FC device, receiving the beacon command at a receipt port of the second FC device, in response to receiving the beacon command, beaconing at the receipt port, and beaconing by the first FC device at the issuance port. The method may further include issuing an acceptance reply by the second FC device, receiving the acceptance reply by the first FC device, wherein the beaconing by the first FC device at the issuance port is in response to receiving the acceptance reply. Beaconing may include activating an indicator.

Further still, one or more other FC devices may be connected between the first FC device and the second FC device and the method may further include receiving the beacon command by the one or more other FC devices, and local beaconing by at least one of the one or more other FC devices in response to receiving the beacon command.

The method may further include selecting the issuance port. Further still, the method may include checking the beacon command for a proper format by the second FC device. In some embodiments, the first FC device includes a host device and the second FC device includes a target device. The first FC device may include a command driver operable to form the beacon command. The second FC device may include a command driver operable to evaluate the beacon command and form the acceptance reply. The beacon command may specify a blink frequency. The beacon command may specify a time duration. The method may further include discontinuing beaconing by the second FC device when a specified time duration has passed. Discontinuing beaconing may include deactivating a light or other visual indicator.

An embodiment of a system includes a first Fibre Channel (FC) device operable to issue a beacon command out an issuance port, wherein the first FC device is further operable to beacon from the issuance port, and a second FC device communicably coupled to the first FC device and operable to receive the beacon command at a receiving port of the second FC device, wherein the second FC device is further operable to beacon at the receiving port in response to receiving the beacon command.

The second FC device may be further operable to issue an acceptance reply to the first FC device. The first FC device may be further operable to receive the acceptance reply and beacon from the issuance port prior to receiving the acceptance reply or in response to receiving the acceptance reply.

An embodiment of the system further includes a third FC device communicably coupled between the first FC device and the second FC device, wherein the third FC device is operable to receive the beacon command at a receiving port of the third FC device and transmit the beacon command out a transmitting port of the third FC device. The third FC device may be further operable to beacon from the receiving port of the third FC device and the transmitting port of the third FC device in response to receiving the beacon command.

In some embodiments of the system, the first FC device comprises a command driver operable to generate the beacon command. In some embodiments of the system, the second FC device includes a command driver operable to evaluate the beacon command and generate the acceptance reply. The command driver may be further operable to cause beaconing at the issuance port. The first FC device may include a host device and the second FC device may include a target device. The second FC device may comprise a switch.

In accordance with some embodiments of a system, the beacon command may specify a blink frequency. One or more of the first FC device and the second FC device may be operable to beacon at the specified blink frequency. The beacon command may specify a time duration. One or more of the first FC device and the second FC device may be operable to beacon for a specified time duration.

Other implementations are also described and recited herein.

BRIEF DESCRIPTIONS OF THE DRAWINGS

DETAILED DESCRIPTIONS

Embodiments of the described technology relate to systems and methods for indicating end-to-end connectivity. Indicating end-to-end connectivity can be done by causing two devices on opposite ends of the link to activate an indicator (e.g., blinking a light-emitting diode (LED) or lamp), or beacon, at respective ports to which the link connects. A first device can generate a beacon command to a second device. The second device receives the beacon command and begins beaconing in response thereto. The second device can generate an acceptance reply to the first device, indicating acceptance of the beacon command. The first device may begin beaconing before receiving the acceptance reply or after receiving the acceptance reply.

In various embodiments, Fibre Channel (FC) devices include command drivers which are able to generate messages for carrying out link end-to-end beaconing. Example FC devices include host devices, such as server computers, target devices, such as storage device, and switches. A command driver in a host device may be operable to generate a beacon command. A command driver in a target device may be operable to receive the beacon command and generate a reply to the beacon command. The command driver in the target device may be further operable to cause beaconing at a port of the target device.

A beacon command has a format. In one embodiment, the format of the beacon command includes a request type field, a blink frequency field and a beacon time duration field. The request type may be an "ON" indicator or an "OFF" indicator, where "ON" indicates that the beacon is to be turned on (activated) and "OFF" indicates that the beacon should be turned off (deactivated). Blink frequency indicates a frequency at which the beacon lamp is to blink when activated. Time duration can be used to indicate how long the beacon should be active. The port to be used for beaconing can be inferred from the port that the beacon command is sent from or received at.

In accordance with various embodiments, end-to-end beaconing may be performed across a link or across a path. A link generally refers to a connection between two devices. As used herein, a path includes multiple links. As such, link end-to-end beaconing refers to beaconing at both ends of a link; path end-to-end beaconing refers to beaconing at two or more ends of links in a path that may traverse more than two devices (e.g., host device(s), target device(s) or switch(es)).

Figure 1:
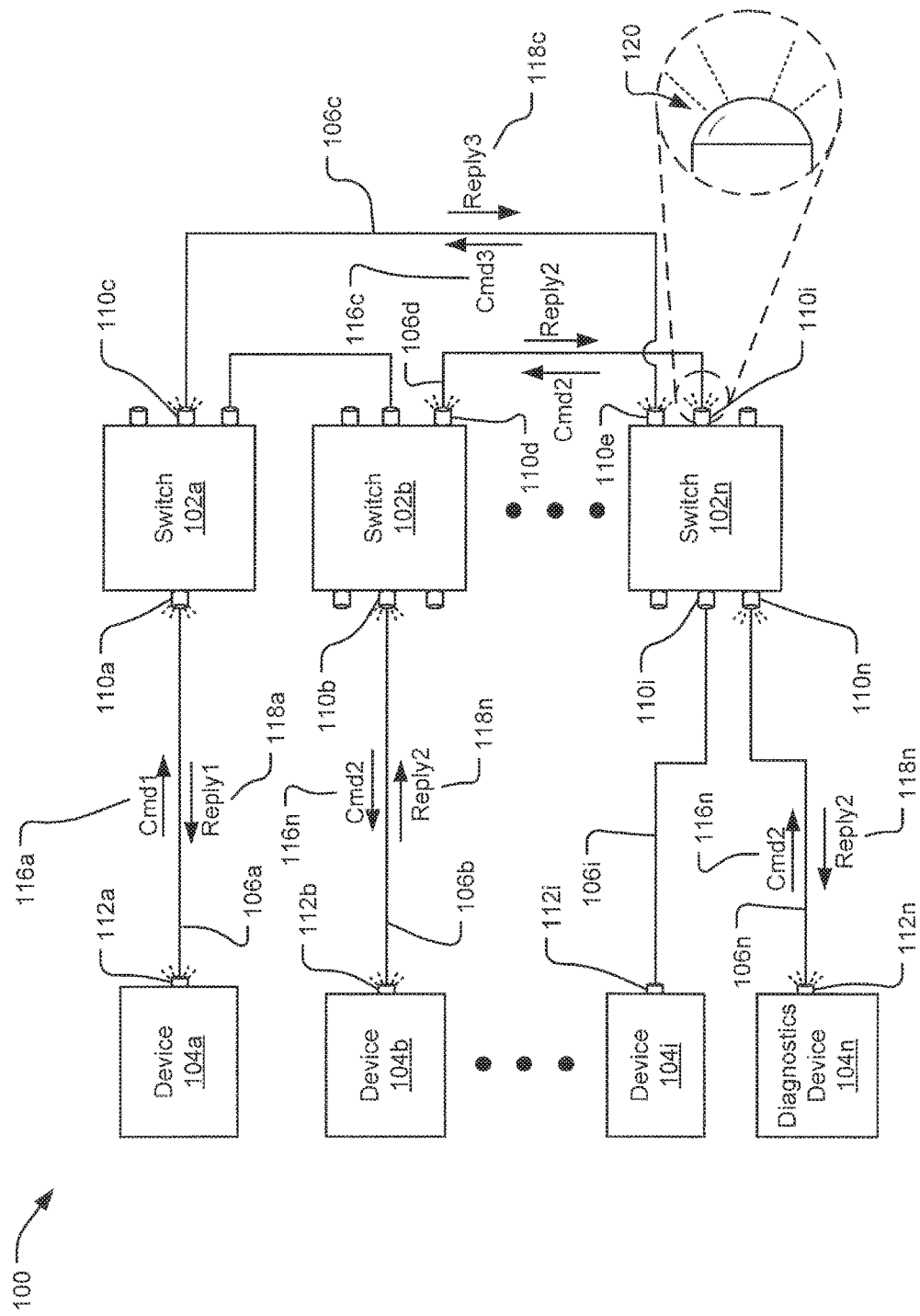
FIG. 1 illustrates an example network in which end-to-end beaconing can be employed according to one or more embodiments of the described technology.

FIG. 1 illustrates an example operating environment 100 including one or more Fibre Channel (FC) devices, such as switches 102 and one or more devices 104. In this embodiment, devices 104 refer to FC devices and can include any devices operable to communicate with switches 102 and other devices 104 via cables 106, which can be wire or fiber-optic cables, using FC technology. However, end-to-end beaconing concepts described herein are not limited to Fibre Channel technology and may find useful application in numerous other environments. Devices 104 may be categorized as host or target devices. A host device generally refers to a server computer or other computing device that may store data on a target device. A target device generally refers to a device that is operable to store data, such as, but not limited to, a mass storage device. A diagnostic device 104n is a particular type of device 104 that includes functionality to monitor and/or perform diagnostics on other devices 104 and/or switches 102.

Cables 106 are attached to switches 102 and devices 104 via physical ports 110 (e.g., E_port, F_port, G_port, etc.) and 112 (e.g., N_port, NL_port, etc.), respectively. For example, in the embodiment of FIG. 1, link 106a is connected to device 104a at port ma and switch 102a at port 110a. As other examples, link 106b interconnects device 104b and switch 102b at port 112b and port 110b, respectively; link 106c interconnects switch 102a and switch 102n at port 110c and port 110e, respectively; link 106d interconnects switch 102b and switch 102n at port 110d and port 110i, respectively; link 106n interconnects device 104n and switch 102n at port 112n and port non, respectively; and so on. Of course, the example interconnections shown in FIG. 1 are merely for illustrative purposes, and the described technology is not limited the particular configuration shown.

Accordingly, in general there may be many devices 104 and switches 102, and many corresponding interconnecting cables 106 connected in numerous different topologies. Determining connectivity between FC devices (e.g., device 104 to switch 102, device 104 to device 104, or switch 102 to switch 102) may be difficult. Interconnectivity determination may be particularly difficult if there are many interconnecting cables 106, if the cables 106 are bundled, if the cables 106 traverse walls, ceilings or floors of a building, or other conditions.

As such, embodiments of systems and methods provide for end-to-end beaconing, whereby visual indicators are generated at devices and/or switches connected to ends of one or more cables. End-to-end beaconing may be link end-to-end beaconing or path end-to-end beaconing. More specifically, visual indicators can show that opposite ends of a cable are connected to particular ports of connected devices and/or switches. End to end beaconing can be employed to indicate device-to-device connections, device-to-switch connections and/or switch-to-switch connections. The cable ends may be ends of a single cable link (one cable section) or ends of a path (multiple cable sections with one or more intervening switches or devices between the end devices or switches). In one embodiment, the visual indicator is a light-emitting diode (LED).

Switches 102 and devices 104 are equipped with port indicators, such as LED 120. LED 120 is typically located in association with a corresponding port. Typically LED 120 is located at or near the associated port. FC devices are operable to selectively activate (and deactivate) LEDs 120 associated with ports. When a FC device, such as switch 102*n*, turns on LED 120 associated with port 110*i*, this is referred to local beaconing.

One or more devices 104, 106 and switches 102 include remote beaconing functionality. In one embodiment, remote beaconing functionality is implemented in a device or switch in a remote beaconing application residing on the device or switch. Remote beaconing functionality enables a switch or other device to remotely command another device to start or stop local beaconing. Remote beaconing functionality at the initiating device can generate requests to beacon and cause local beaconing. Remote beaconing functionality at a commanded device (i.e., a device receiving a command to locally beacon) can interpret requests to beacon, reply to requests to beacon, activate local beaconing in response to requests to beacon, and/or other functions.

For example, device 104*a* can send beacon command (CMD1) 116*a* out port 112*a* to switch 102*a* through port 110*a* to command switch 102*a* to locally beacon at port 110*a*. Switch 102*a* responds by sending acceptance reply (Reply 1) 118*a* to device 104*a* and starting local beaconing at port 110*a*. When device 104*a* receives acceptance reply 118*a*, device 104*a* begins local beaconing at port 112*a*. In this manner link end-to-end beaconing indicates interconnectivity of link 106*a* between port 112*a* and 110*a*.

As another example, switch 102*n* and switch 102*a* can perform link end-to-end beaconing via link 106*c*. Switch 102*n* can initiate by sending a beacon command (CMD3) 116*c* out port 110*e* to port 110*c* of switch 102*a*. Switch 102*a* responds with acceptance reply (Reply 3) 118*c* that is sent out port 110*c*, and begins local beaconing at port 110*c*. Switch 102*n* receives reply 118*c* and begins local beaconing at port 110*e*. As such, ends of the link 106*c* are identified.

As yet another example, device 104*n* can initiate path end-to-end beaconing to check ends of the path between device 104*n* and device 104*b*. Device 104*n* sends a beacon command (CMD2) 116*n* out port 112*n* toward device 104*b*. The command 116*n* is routed through switch 102*n* and switch 102*b* toward device 104*b*. Device 104*b* receives command 116*n* and sends reply 118*n*, acknowledging receipt of the command 116*n*. Device 104*b* then begins local beaconing at port 112*b*. Reply 118*n* is routed through switch 102*b* and switch 102*n* to device 104*n*. Device 104 receives reply 118*n* and begins local beaconing at port 112*n*. As such, the ends of the path formed from link 106*b*, link 106*d* and link 106*n* are indicated. Local beaconing at intermediate ports (port 110*b*, port 110*d*, 110*i* and 110*n*) may or may not occur.

Figure 2:
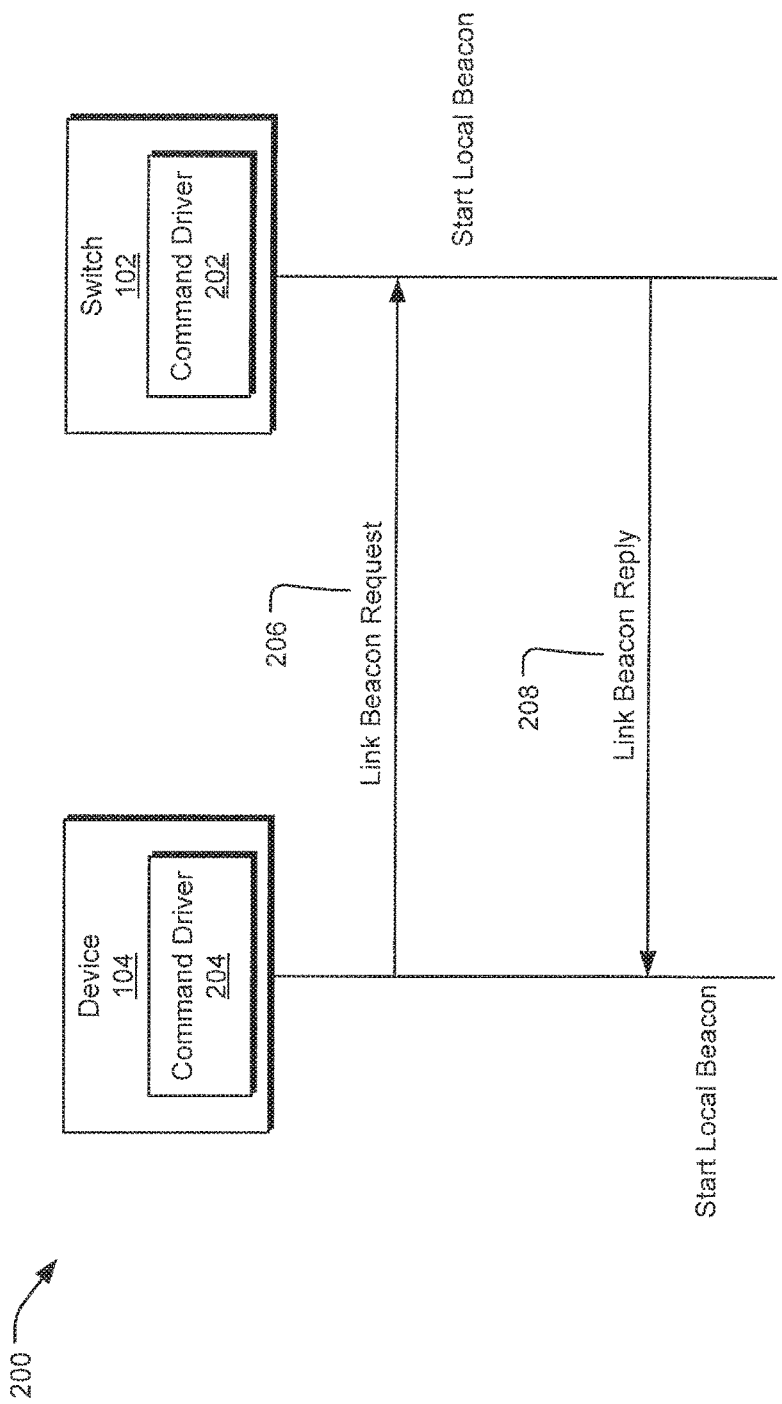
FIG. 2 illustrates Fibre Channel (FC) devices communicating with each other to carry out end-to-end beaconing according to an embodiment of the described technology.

FIG. 2 is a sequence diagram illustrating a messaging sequence 200 between two FC devices, device 104 and switch 102, wherein end-to-end beaconing is carried out. In this embodiment, FC devices each include a command driver, such as switch command driver 202 and device command driver 204, for generating and/or responding to commands related to end-to-end beaconing. Device command drive 204 generates local beacon request 206, which is sent to switch 102. Switch command driver 202 receives the request 206 and parses it. Switch command driver 202 then creates a reply 208, acknowledging receipt of the request 206. Reply 208 is sent to device 104. Device command driver 104 receives reply 208 and parses it. Switch command driver 202 and device command driver 204 each include functionality to cause local beaconing to begin. Local beaconing continues at device 104 and switch 102 for a specified duration or until another command is issued to stop local beaconing.

Figure 3:
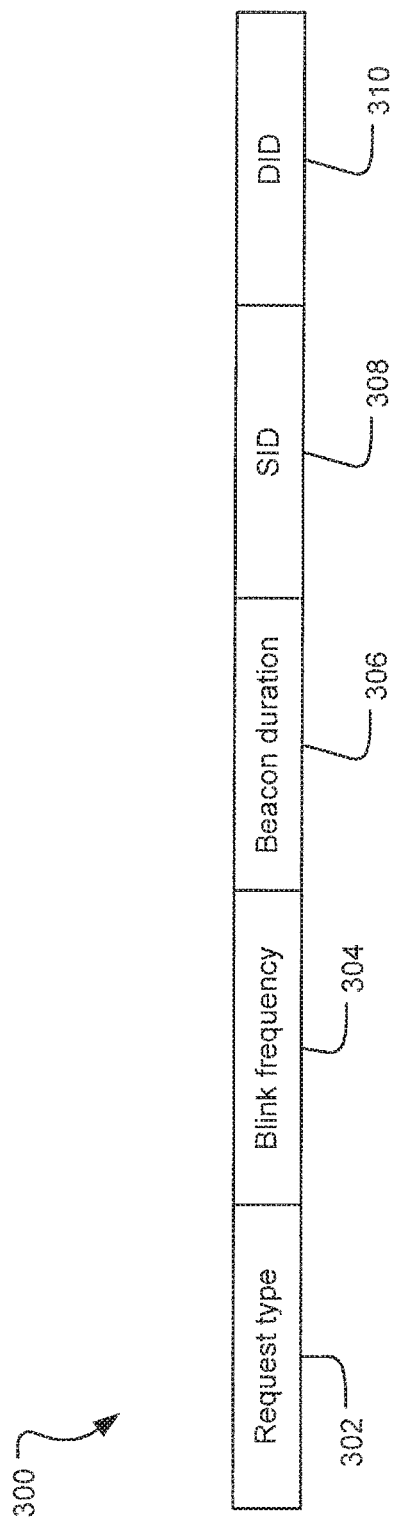
FIG. 3 illustrates an example beacon command format.

FIG. 3 illustrates an example beacon command 300 having a format that includes a number of data fields. In general, the data fields need not be in the particular order shown, but could be rearranged in any manner. In this particular embodiment, the data fields include a request type field 302, a blink frequency field 304, a beacon duration field 306, a source identifier (SID) field 308 and a destination identifier (DID) field 310. The request type field 302 indicates a type of request. The request type field can indicate whether the beacon is to be turned on or off. The blink frequency field 304 specifies a frequency at which the beacon should blink on and off. The blink frequency field 304 may be set to a predetermined value, such as zero, to indicate that there should be no blinking. The beacon duration field 306 specifies a time duration that the beacon is to remain on. SID field 308 includes a source identifier address and DID field 310 includes a destination identifier address.

In one embodiment, if the beacon duration field 306 is set to a non-zero value, this indicates that the beacon should remain on for a number of seconds equivalent to the non-zero value. If the beacon duration field 306 is set to zero, this indicates that the beacon should remain on until a beacon command is received that indicates the beacon is to be turned off (i.e., request type 302 is set to "OFF"). In one embodiment, the blink frequency field 304 specifies frequency as a number of blinks per 10 seconds.

Tables 1 and 2 below describe the command beacon fields in one particular embodiment:

TABLE 1

| Field Name | Description |
|---|---|
| Request type | ON or OFF request |
| Blink Frequency | Blink frequency specified as number of blinks per 10 seconds |
| Beacon Duration | Only used in ON request type; If set to non-zero, indicates number of seconds after which beaconing should be stopped; If set to zero, beacon until a beacon OFF request is received. |

TABLE 2

| | Connectivity type used | |
|---|---|---|
| | SID | DID |
| Host/Target to Switch | Host/Target's FC Address (24 bit address) | Fabric Controller (0xFFFFFD) or F_Port Controller (0xFFFFFE) |
| Host-Target or Target-Host | Host FC Address (24 bit Address) | Target FC Address (24 bit Address) |
| Switch-Switch | Fabric Controller (0xFFFFFD) | Fabric Controller (0xFFFFFD) |

Figure 4:
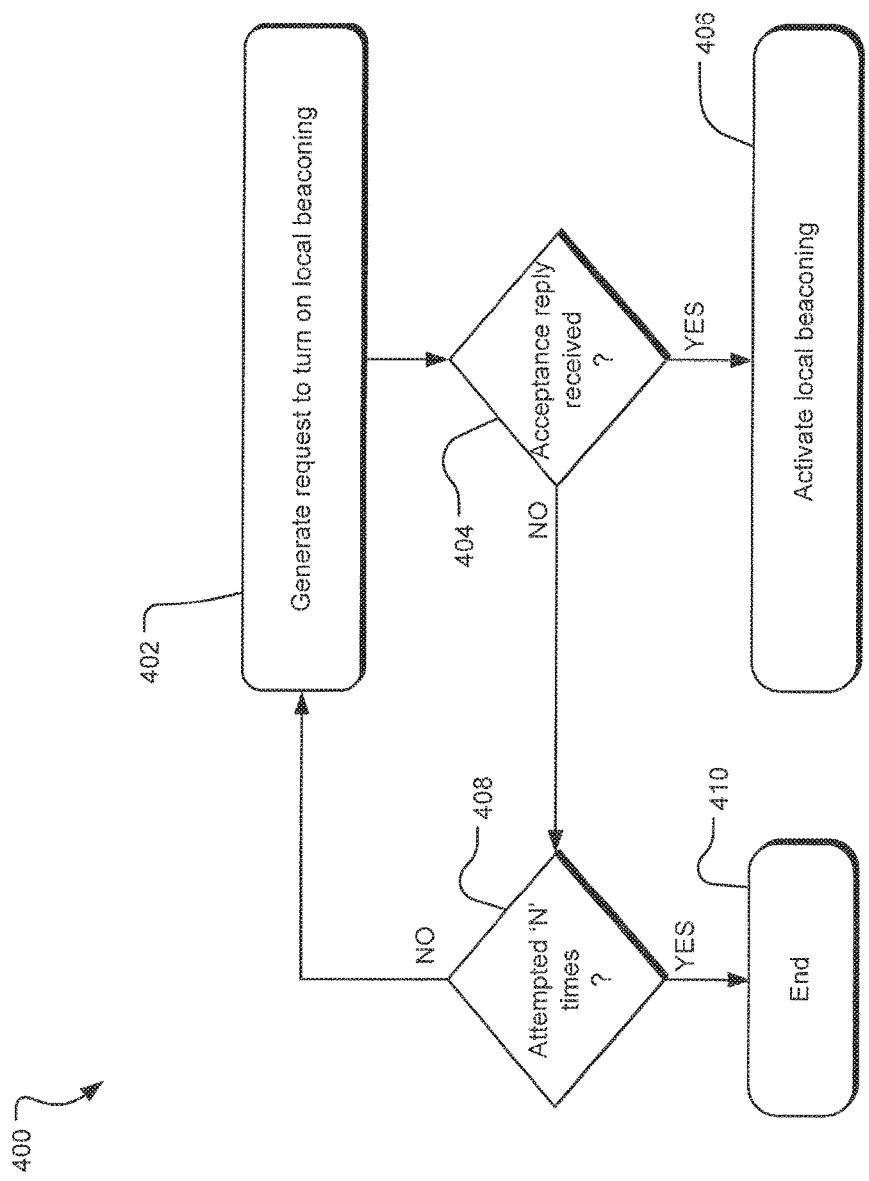
FIG. 4 is a flowchart illustrating an example algorithm for carrying out end-to-end beaconing from the perspective of a FC device initiating the end-to-end beaconing.

FIG. 4 is a flowchart illustrating an initiator's end-to-end beaconing algorithm 400 from the perspective of a FC device (e.g., a switch or other device) that initiates end-to-end beaconing. In a generating operation 402, a beaconing request is generated to remotely command a destination device to start local beaconing. The generating operation 402 forms the request, which may include fields such as those shown in FIG. 3 and described above, and sends the request out a port toward the destination device. The request may be generated in response to user input. After some time, the initiating device checks whether an acceptance reply has been received in query operation 404. If the beaconing request was accepted by the destination device, an acceptance reply is sent from the destination device to the initiating device. The query operation 404 receives a reply and checks whether the reply indicates acceptance. If it is determined that an acceptance reply was received, the algorithm 400 branches "YES" to an activating operation 406. In activating operation 406, local beaconing is started at the initiating device. The local visual indicator (e.g., LED or other beacon indicator) is turned on and may blink according to a specified blink frequency. The beacon may stay on for a specified duration or until a command is generated to stop beaconing, at which point beaconing is deactivated.

Alternatively, if the query operation 404 determines that an acceptance reply has not been received, the algorithm 400 branches "NO" to another query operation 408. An acceptance reply may not be received for a number of reasons. For example, a rejection reply may be received that indicates that the beacon command was rejected. As another example, after a selected time-out time period, no reply may be received. Under such situations, the query operation 408 determines whether the beaconing command has been attempted a specified number of times, 'N'. The number 'N' may be any positive number, and in some embodiments may be selectable or configurable by a user. If the beaconing command has not been attempted 'N' number of times, the algorithm branches "NO" back to the generating operation 402 where another beacon command is generated. If the beaconing command has been attempted 'N' times, the algorithm 400 branches "YES" to an end operation 410 where attempts at end to end beaconing end.

In the case that the beaconing command is only to be attempted once, the value of 'N' is one. In this case, the query operation 408 is not necessary. In this situation, if query operation 404 determines that an acceptance reply is not received, the algorithm 400 branches "NO" directly from query operation 404 to end operation 410.

Figure 5:
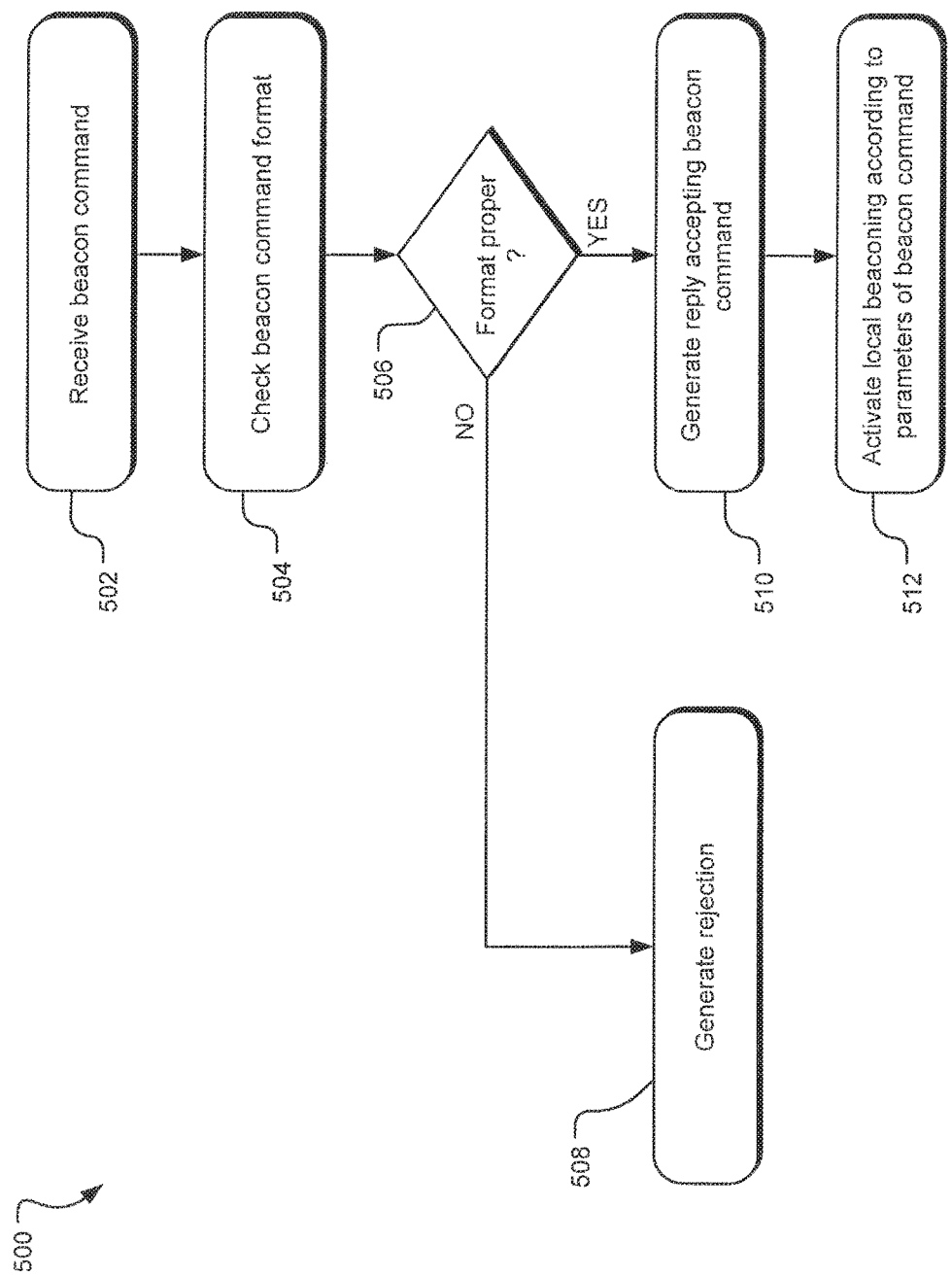
FIG. 5 is a flowchart illustrating an example algorithm for carrying out end-to-end beaconing from the perspective of a FC device that is commanded to locally beacon.

FIG. 5 is a flowchart illustrating a recipient's end-to-end beaconing algorithm 500 from the perspective of a FC device (e.g., a switch or other device) that is commanded to beacon locally. In a receiving operation 502, a beaconing request is received that commands the FC device to start local beaconing. In a checking operation 504, the beaconing request is checked for proper format. Checking operation 504 may parse the different fields of the request and determine that values of the fields are within predetermined bounds. A query operation 506 queries whether the command format is proper. If the command format is determined to be improper, the algorithm 500 branches "NO" to generating operation 508. Generating operation 508 generates a rejection reply and sends the rejection reply to the initiating FC device. The rejection reply includes one or more fields of data indicating that the receiving device has rejected the request to activate local beaconing.

If the beaconing request is determined to be in the proper format, the algorithm 500 branches "YES" to a generating operation 510, which generates an acceptance reply. Generating operation 510 forms the acceptance reply and sends the reply back to the FC device that sent the beaconing request. The acceptance reply generally includes one or more fields indicating that the receiving device acknowledges receipt of the request and accepts the beaconing request. In an activating operation 512, local beaconing is started at the receiving device. The local visual indicator (e.g., LED or other beacon light) is turned on and may blink according to a specified blink frequency. The beacon may stay on for a specified duration or until a command is generated to stop beaconing, at which point beaconing is deactivated.

Figure 6:
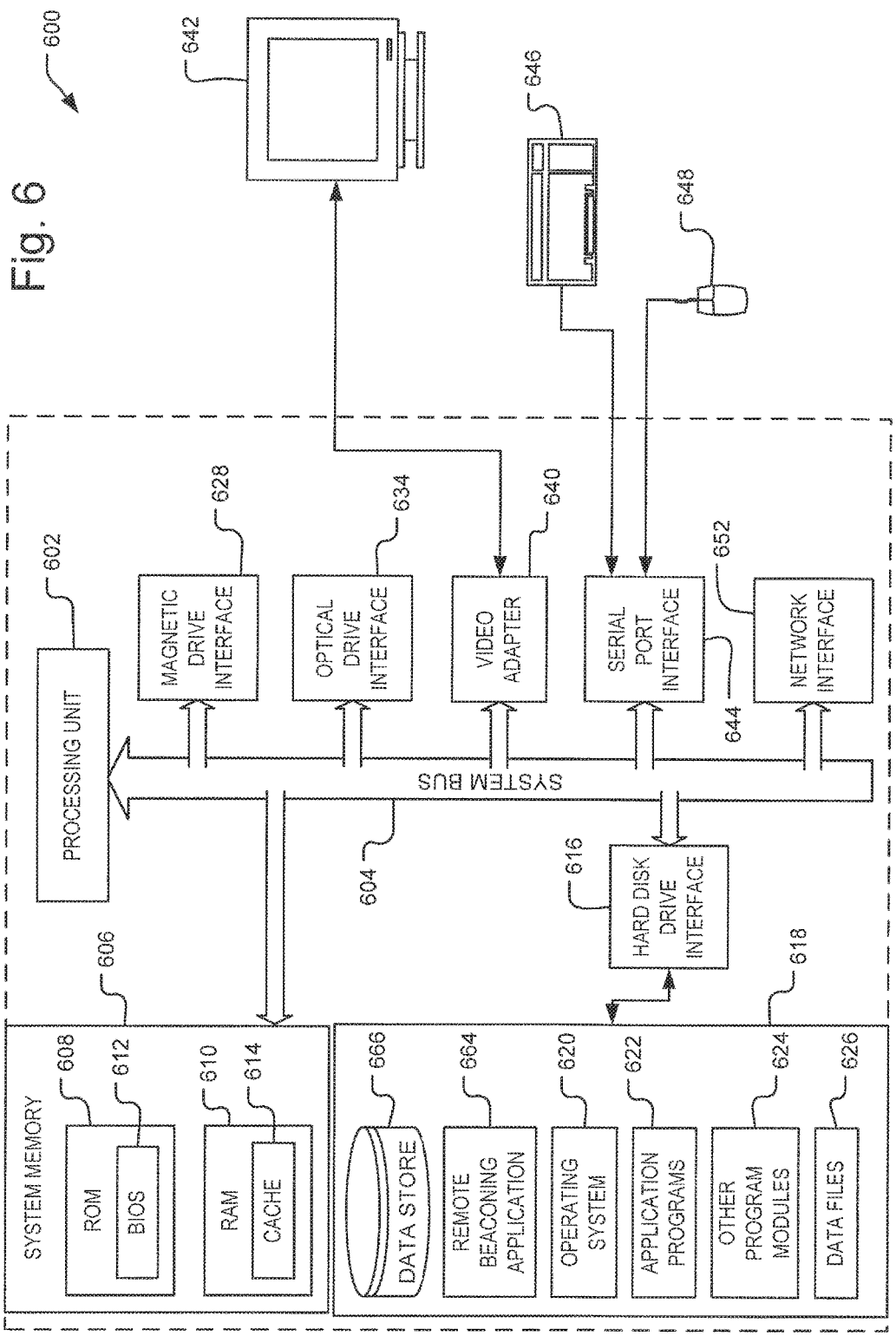
FIG. 6 illustrates an example computing device upon which embodiments of the described technology may be implemented.

An exemplary computer system 600 for implementing aspects of end-to-end beaconing processes above is depicted in FIG. 6. The computer system 600 may be in the form of server computers, personal computers (PC), or other special purpose computers with internal processing and memory components as well as interface components for connection with external input, output, storage, network, and other types of peripheral devices. Alternatively, the computer system 600 may be in the form of any of a notebook or portable computer, a tablet PC, a handheld media player (e.g., an MP3 player), a smart phone device, a video gaming device, a set top box, a workstation, a mainframe computer, a distributed computer, an Internet appliance, or other computer devices, or combinations thereof. Internal components of the computer system in FIG. 6 are shown within the dashed line and external components are shown outside of the dashed line. Components that may be internal or external are shown straddling the dashed line.

The computer system 600 includes a processor 602 and a system memory 606 connected by a system bus 604 that also operatively couples various system components. There may be one or more processors 602, e.g., a single central processing unit (CPU), or a plurality of processing units, commonly referred to as a parallel processing environment. The system bus 604 may be any of several types of bus structures including a memory bus or memory controller, a peripheral bus, a switched-fabric, point-to-point connection, and a local bus using any of a variety of bus architectures. The system memory 606 includes read only memory (ROM) 608 and random access memory (RAM) 610. A basic input/output system (BIOS) 612, containing the basic routines that help to transfer information between elements within the computer system 600, such as during start-up, is stored in ROM 608. A cache 614 may be set aside in RAM 610 to provide a high speed memory store for frequently accessed data.

A hard disk drive interface 616 may be connected with the system bus 604 to provide read and write access to a data storage device, e.g., a hard disk drive 618, for nonvolatile storage of applications, files, and data. A number of program modules and other data may be stored on the hard disk 618, including an operating system 620, one or more application programs 622, other program modules 624, and data files 626. In an exemplary implementation, the hard disk drive 618 or other memory may further store a remote beaconing application 664 and its corresponding modules. The hard disk drive 618 may additionally contain a data store 666 for maintaining the success and failure tables and other database server information described above. Note that the hard disk drive 618 may be either an internal component or an external component of the computer system 600 as indicated by the hard disk drive 618 straddling the dashed line in FIG. 6. In some configurations, there may be both an internal and an external hard disk drive 618.

A display device 642, e.g., a monitor, a television, or a projector, or other type of presentation device may also be connected to the system bus 604 via an interface, such as a video adapter 640 or video card. Similarly, audio devices, for example, external speakers or a microphone (not shown), may be connected to the system bus 604 through an audio card or other audio interface (not shown).

In addition to the monitor 642, the computer system 600 may include other peripheral input and output devices, which are often connected to the processor 602 and memory 606 through the serial port interface 644 that is coupled to the system bus 606. Input and output devices may also or alternately be connected with the system bus 604 by other interfaces, for example, a universal serial bus (USB), a parallel port, or a FireWire (IEEE 1394) port. A user may enter commands and information into the computer system 600 through various input devices including, for example, a keyboard 646 and pointing device 648, for example, a mouse. It should also be appreciated that other types of computer-readable media and associated drives for storing data, for example, magnetic cassettes or flash memory drives, may be accessed by the computer system 600 via the serial port interface 644 (e.g., USB) or similar port interface.

Figure 7:
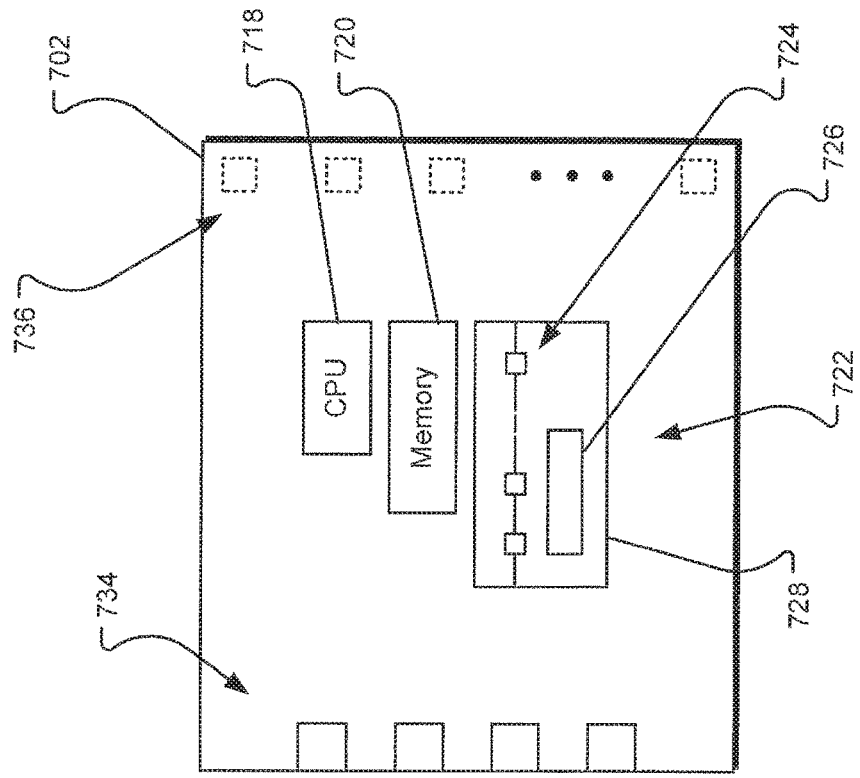
FIG. 7 illustrates an example switch upon which embodiments of the described technology may be implemented.

FIG. 7 illustrates a switch 702 including functional components for switching data frames therethrough from input ports to output ports, as well as carrying out end-to-end beaconing according to embodiments described here. The switch 702 includes a CPU module 718 that controls the initialization of the switch 702. The CPU module 718 typically includes a processor used with a local memory module 720. Local memory module 720 may include instructions executable by the CPU to carry out end-to-end beaconing functionality. For example, local memory module 720 may include one or more command drivers for generating beaconing commands and/or responding to beaconing commands. Additional components 722 can also be included in the switch 702, such as transmit and receive queues 724, a clock timer 726, additional memory, registers, logical routing tables, etc. The additional components are shown as being embodied within an ASIC 728 in the switch 702, although other implementations may be employed.

The embodiments of the technology described herein are implemented as logical steps in one or more computer systems. The logical operations of the present described technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the described technology. Since many embodiments of the described technology can be made without departing from the spirit and scope of the described technology, the described technology resides in the claims hereinafter appended. Furthermore, structural features of the different embodiments may be combined in yet another embodiment without departing from the recited claims.

What is claimed is:

1. A method comprising:
generating a beacon command directing an addressed device to activate a light generating device physically located at and associated with a receipt port receiving the beacon command of the addressed device, the receipt port capable of performing normal network data transfer communications, the light generating device emitting light that is visible to a user; and
transmitting, from a transmitting port capable of performing normal network data transfer communications, the beacon command to the addressed device, wherein
the beacon command comprises at least a first field including a blink frequency value indicating a frequency at which to blink the light generating device.

2. The method of claim 1, further comprising:
receiving, at the transmitting port, an acceptance reply from the addressed device, the acceptance reply indicating that the beacon command is accepted by the addressed device; and
in response to receiving the acceptance reply, activating a light generating device physically located at and associated with the transmitting port, the light generating device emitting light that is visible to a user.

3. The method of claim 1, wherein the beacon command is further configured to cause activation of a light generating device physically located at and associated with a receipt port receiving the beacon command and a light generating device physically located at and associated with a transmitting port transmitting the beacon command, each light generating device emitting light that is visible to a user, at one or more other devices that receive and forward the beacon command toward the addressed device.

4. The method of claim 1, wherein the beacon command comprises a second field including a request type specifying activation of the light generating device.

5. The method of claim 4, wherein the beacon command comprises a third field including a duration value indicating a time duration to activate the light generating device.

6. A system comprising:
a processor;
a transmitting port coupled to the processor, for coupling to an addressed device and capable of performing normal network data transfer communications; and
a memory coupled to the processor and including instructions executable by the processor, wherein the instructions cause the processor to
generate a beacon command directing the addressed device to activate a light generating device physically located at and associated with a receipt port receiving the beacon command of the addressed device, the receipt port capable of performing normal network data transfer communications, the light generating device emitting light that is visible to a user; and
issue the beacon command from the transmitting port to the addressed device, wherein
the beacon command includes a plurality of fields comprising one or more of: a blink frequency indicating a frequency at which to blink a light generating device physically located at and associated with a receipt port receiving the beacon command of the addressed device; and a blink duration indicating a time duration for which to keep a light generating device physically located at and associated with a receipt port receiving the beacon command of the addressed device activated.

7. The system of claim 6, wherein the beacon command is further configured to cause activation of a light generating device physically located at and associated with a receipt port receiving the beacon command and a light generating device physically located at and associated with a transmitting port transmitting the beacon command, each light generating device emitting light that is visible to a user, at one or more other devices that receive and forward the beacon command toward the addressed device.

8. The system of claim 6, wherein the transmitting port includes a light generating device physically located at and associated with the transmitting port, the light generating device emitting light that is visible to a user, wherein the transmitting port receives an acceptance reply accepting the beacon command from the addressed device, and wherein the memory further includes instructions which cause the processor, in response to receiving, at the transmitting port, the acceptance reply to activate the light generating device physically located at and associated with the transmitting port.

9. The method of claim 1, wherein the blink frequency value indicates a number of blinks during a predetermined time interval.

10. The method of claim 9, wherein the predetermined time interval is 10 seconds.

11. The method of claim 1, wherein the beacon command comprises a second field including a duration value indicating a time duration to activate the light generating device.

12. The system of claim 6, wherein the blink frequency value indicates a number of blinks during a predetermined time interval.

13. The system of claim 12, wherein the predetermined time interval is 10 seconds.

14. An electronic device comprising:
circuitry; and
a transmitting port coupled to the circuitry, for coupling to an addressed device and capable of performing network data transfer communications, wherein
the circuitry is configured to
generate a beacon command directing the addressed device to activate a light generating device physically located at and associated with a receipt port receiving the beacon command of the addressed device, wherein the beacon command includes at least a first field including a blink frequency value indicating a frequency at which to blink the light generating device and a second field including a blink duration value indicating a time duration for which to keep the light generating device activated; and
control the transmitting port to transmit the beacon command to the addressed device.

15. The electronic device of claim 14, wherein the blink frequency value indicates a number of blinks during a predetermined time interval.

16. The electronic device of claim 15, wherein the predetermined time interval is 10 seconds.

17. The electronic device of claim 14, wherein the beacon command includes a third field including a request type specifying activation of the light generating device.

* * * * *